United States Patent
Baeckler et al.

(10) Patent No.: US 10,867,090 B2
(45) Date of Patent: Dec. 15, 2020

(54) METHOD AND APPARATUS FOR IMPLEMENTING AN APPLICATION AWARE SYSTEM ON A PROGRAMMABLE LOGIC DEVICE

(71) Applicant: Intel Corporation, Santa Clara, CA (US)

(72) Inventors: Gregg William Baeckler, San Jose, CA (US); Martin Langhammer, Alderbury (GB); Sergey Gribok, Santa Clara, CA (US); Scott J. Weber, Piedmont, CA (US); Gregory Steinke, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/356,713

(22) Filed: Mar. 18, 2019

(65) Prior Publication Data
US 2019/0213289 A1    Jul. 11, 2019

(51) Int. Cl.
*G06F 17/50* (2006.01)
*G06F 30/327* (2020.01)
*G06F 9/445* (2018.01)
*G06F 1/03* (2006.01)
*G06F 30/34* (2020.01)

(52) U.S. Cl.
CPC .............. *G06F 30/327* (2020.01); *G06F 1/03* (2013.01); *G06F 9/44505* (2013.01); *G06F 30/34* (2020.01)

(58) Field of Classification Search
CPC .... G06F 30/327; G06F 30/34; G06F 9/44505; G06F 1/03
See application file for complete search history.

(56) References Cited

U.S. PATENT DOCUMENTS

| | | | |
|---|---|---|---|
| 6,331,790 B1 * | 12/2001 | Or-Bach | H01L 27/118 326/38 |
| 7,603,646 B1 | 10/2009 | Jang et al. | |
| 7,823,092 B1 * | 10/2010 | Perry | H03H 17/0294 716/101 |
| 7,895,549 B1 * | 2/2011 | Perry | G06F 30/327 716/100 |
| 7,979,827 B1 * | 7/2011 | Trimberger | G06F 30/34 716/117 |

(Continued)

OTHER PUBLICATIONS

Rani J Sheeba et al., "FPGA based partial reconfigurable fir filter design", 2014 IEEE International Advance Computing Conference (IACC), IEEE, Feb. 21, 2014 (Feb. 21, 2014), pp. 789-792.

(Continued)

*Primary Examiner* — Nghia M Doan

(57) ABSTRACT

A method for designing a system on a target device is disclosed. The system is synthesized from a register transfer level description. The system is placed on the target device. The system is routed on the target device. A configuration file is generated that reflects the synthesizing, placing, and routing of the system for programming the target device. A modification for the system is identified. The configuration file is modified to effectuate the modification for the system without changing the placing and routing of the system.

24 Claims, 23 Drawing Sheets

(56) References Cited

U.S. PATENT DOCUMENTS 10,339,244 B1 * 7/2019 Gamsa ............... G06F 30/3312
10,423,747 B2 * 9/2019 Weber ................. G06F 30/392

OTHER PUBLICATIONS

Daniel Llamocca et al., "A Dynamically Reconfigurable Pixel Processor System Based on Power/Energy-Performance-Accuracy Optimization", IEEE Transactions on Circuits and Systems for Video Technology, Institute of Electrical and Electronics Engineers, US, vol. 23, No. 3, Mar. 1, 2013 (Mar. 1, 2013), pp. 488-502.
European Patent Office, European Search Report, European application No. EP 20151875.0 entitled "Method and Apparatus for Implementing an Application Aware System on a Programmable Logic Device", dated Sep. 4, 2020, pp. 1-12.

* cited by examiner

FIG. 8

Table 1 — Programming pattern for 3.2:1 behavior

| select | m0 | m1 | m2 | m3 | m4 | m5 | m6 | m7 | Out |
|---|---|---|---|---|---|---|---|---|---|
| 0 | d0 | | | | | | | | A |
| 1 | d1 | | | | | | | | A |
| 2 | d2 | | | | | | | | A |
| 3 | d3 | | | | | | | | A |
| 4 | | d4 | | | | | | | B |
| 5 | | d5 | | | | | | | B |
| 6 | | d6 | | | | | | | B |
| 7 | | d7 | | | | | | | B |
| 8 | | | d8 | | | | 0 | 0 | C |
| 9 | | | d9 | | | | 0 | 0 | C |
| 10 | | | d10 | | | | 0 | 0 | C |
| 11 | | | d11 | | | | 0 | 0 | C |
| 12 | | | | d12 | | | 0 | 0 | D |
| 13 | | | | d13 | | | 0 | 0 | D |
| 14 | | | | d14 | | | 0 | 0 | D |
| 15 | | | | d15 | | | 0 | 0 | C |
| 16 | | | | | d16 | | 1 | 1 | C |
| 17 | | | | | d17 | | 1 | 1 | C |
| 18 | | | | | d18 | | 1 | 1 | C |
| 19 | | | | | d19 | | 1 | 1 | C |
| 20 | | | | | | d20 | 1 | 1 | D |
| 21 | | | | | | d21 | 1 | 1 | D |
| 22 | | | | | | d22 | 1 | 1 | D |
| 23 | | | | | | d23 | 1 | 1 | D |

$A * 0 = 0$ $A * 1 = A$ $A * 2 = A<<1$ $A * 3 = A<<1 + A$ $A * 4 = A<<2$ $A * 5 = A<<2 + A$ $A * 6 = A<<2 + A<<1$ $A * 7 = A<<3 - A = A<<3 + \sim A + 1$ $A * 8 = A<<3$ $A * -1 = -A = \sim A + 1$ $A * -2 = -(A<<1) = \sim(A<<1) + 1$ $A * -3 = -(A<<2) + A = \sim(A<<2) + A + 1$ $A * -4 = -(A<<2) = \sim(A<<2) + 1$ $A * -5 = -(A<<2) - A = \sim(A<<2) + \sim(A) + 2$ $A * -6 = -(A<<3) + (A<<1) = \sim(A<<3) + (A<<2) + 1$ $A * -7 = -(A<<3) + A = \sim(A<<3) + A + 1$ $A * -8 = -(A<<3) = \sim(A<<3) + 1$

FIG. 10

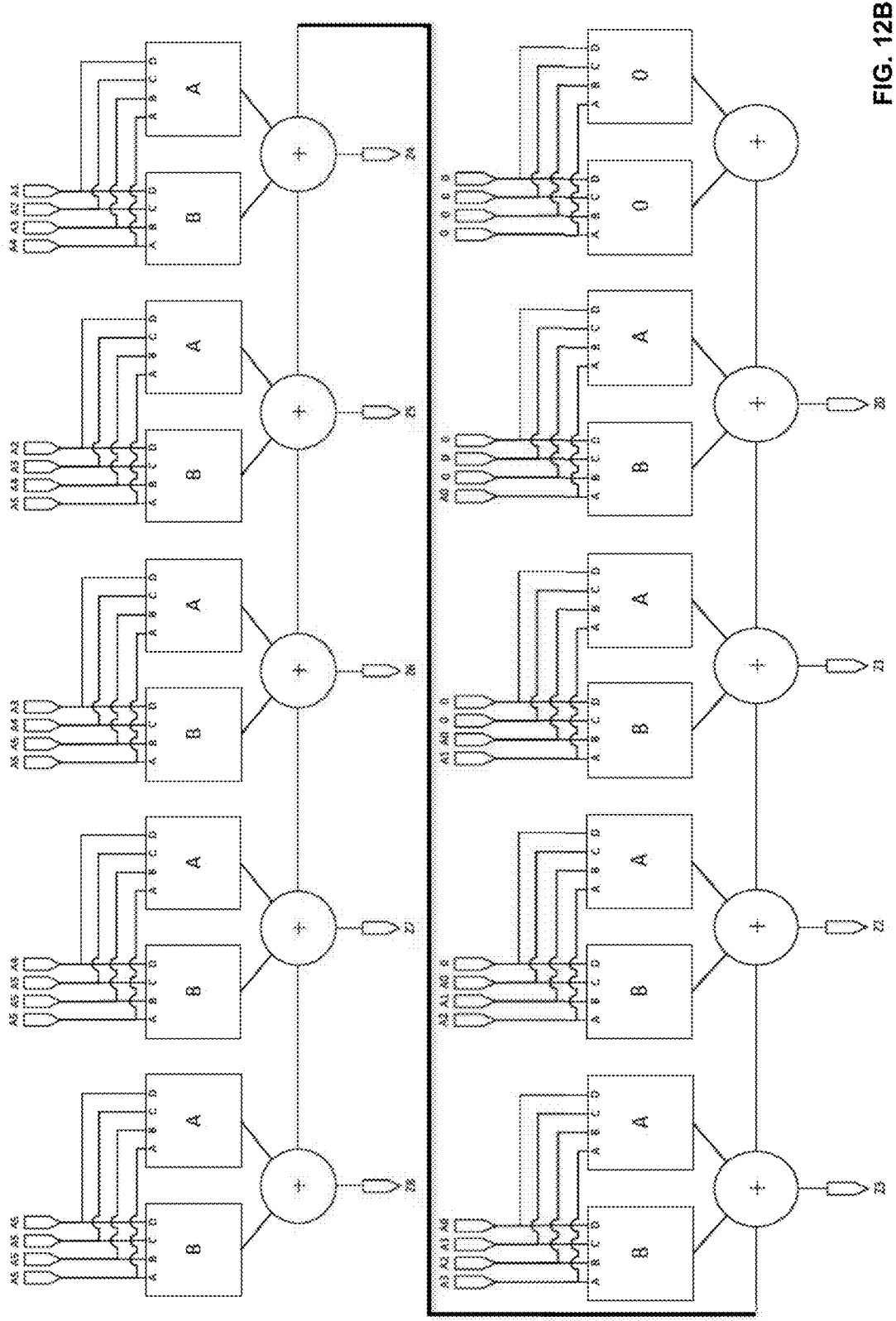

METHOD AND APPARATUS FOR IMPLEMENTING AN APPLICATION AWARE SYSTEM ON A PROGRAMMABLE LOGIC DEVICE

FIELD

Embodiments of the present disclosure relate to programmable logic devices. More specifically, embodiments of the present disclosure relate to a method and apparatus for implementing an application aware system on a programmable logic device.

BACKGROUND

Target devices such as programmable logic devices (PLDs), application specific integrated circuits (ASICs), and structured ASICs are used to implement large systems that may include millions of gates and megabits of embedded memory. The complexity of a large system often requires the use of electronic design automation (EDA) tools to create and optimize a design for the system onto a physical target device. Among the procedures performed by EDA tools in a traditional computer aided design (CAD) compilation flow is hardware description language (HDL) compilation. HDL compilation involves performing synthesis, placement, routing, and timing analysis of the system on the target device. As target devices become larger, they become more difficult to place and route and require longer compilation time.

Machine learning has become increasing valuable in a number of technical fields. For example, machine learning may be used in natural language processing, computer vision, bioinformatics, and economics. Many of the computations involved in machine learning are based on inference using available data, which may be facilitated by the utilization of multipliers. Implementing large arrays of high precision multipliers on a target device may be expensive. Accordingly, to accommodate the growth and improvement of machine learning applications, the need arises for target devices to efficiently pack a large number of multipliers such that the logic on the target device is efficiently utilized to conserve area, power, and routing resources. Compiling systems that support machine learning applications may also require long compile time.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 8 illustrates a table for programming the improved 32:1 multiplexer according to an embodiment of the present disclosure.

FIG. 10 illustrates relationships used for performing canonic constant multiplication using a LUT mask according to an exemplary embodiment of the present disclosure.

FIGS. 12A-12B illustrate a LUT mask for the programming for simple cases x2 and x3 according to an exemplary embodiment of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
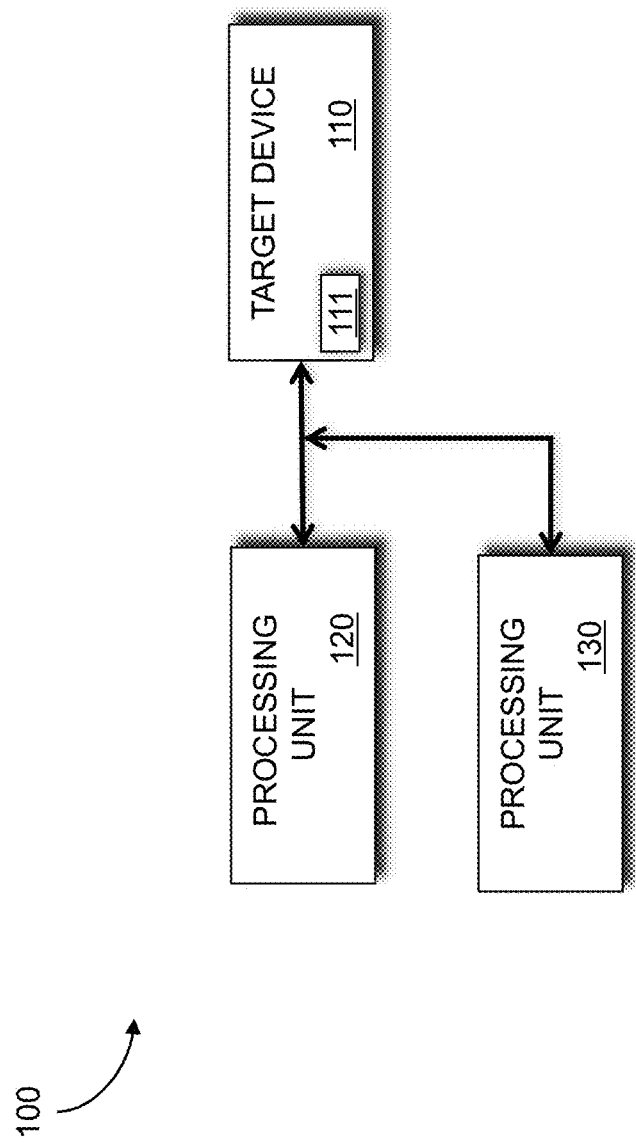
FIG. 1 is a block diagram of a hardware configuration for implementing an application aware system on a target device according to an exemplary embodiment of the present disclosure.

FIG. 1 is a block diagram of a hardware configuration 100 for implementing an application aware system on a target device 110 according to an exemplary embodiment of the present disclosure. The hardware configuration 100 includes a first processing unit 120 and a second processing unit 130.

In this example, the target device 110 uses a programmable logic device (PLD) to implement the application aware system.

The first processing unit 120 generates a design for the system. According to an embodiment of the present disclosure, the first processing unit 120 may be implemented by a computer system. The first processing unit 120 uses computer electronic design automation (EDA) tools to perform synthesis, placement, and routing on the system and to generate a configuration file (program file) that reflects the synthesis, placement, and routing for programming the target device 110. The configuration file may include an initial overlay for the system. According to an embodiment of the present disclosure, an overlay is a reconfigurable architecture implemented on a section of a target device. A first overlay that performs a first function may be subsequently replaced by a second overlay, which reconfigures the target device to perform a second function.

The second processing unit 130 identifies a modification for the system and modifies the configuration file to reflect the modification. According to an embodiment of the present disclosure, the modified configuration file includes a second overlay for the system. The second processing unit 130 may be implemented by a computer system that has fewer processing capabilities than the computer system implementing the first processing unit 120. The second processing unit 130 modifies the configuration file without performing synthesis, placement, and routing and avoids long compilation time.

According to an embodiment of the present disclosure, the target device 110 may include an internal processing unit 111 that performs the functionality of the second processing unit 130. The internal processing unit 111 in the target device 110 may be implemented by a hard processor, soft processor, state machine, or other processing unit capable of identifying a modification for the system and modifying a configuration to reflect the modification.

Figure 2:
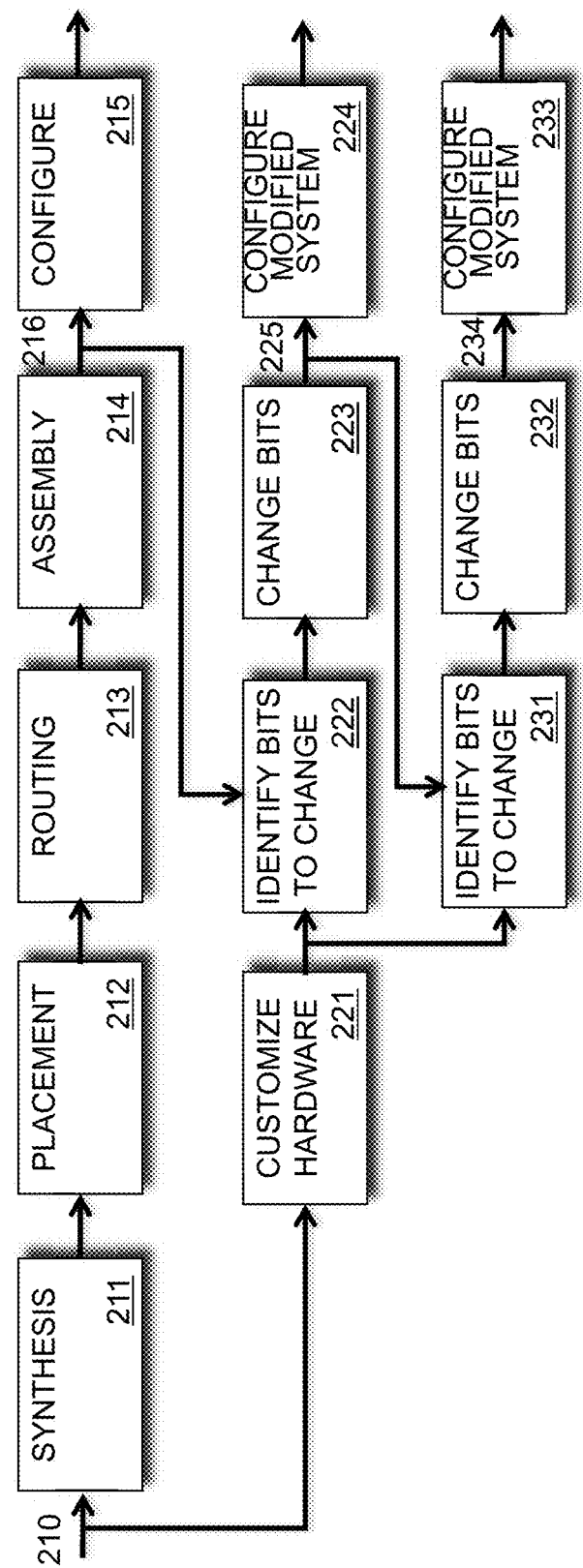
FIG. 2 is a flow chart illustrating a method for implementing an application aware system on a target device according to an exemplary embodiment of the present disclosure.

FIG. 2 is a flow chart illustrating a method for implementing an application aware system on a target device according to an exemplary embodiment of the present disclosure. The procedures described in FIG. 2 may collectively be referred to as "compilation" of a design. The target device may be a programmable logic device such as a field programmable gate array (FPGA), application specific integrated circuit (ASIC), a structured ASIC, or other device whose functionality may be described by a hardware description language (HDL). Procedures 211-214, described with reference to FIG. 2, may be performed by an electronic design automation tool on a first processing unit such as first processing unit 120 (shown in FIG. 1). A register transfer language (RTL) description of a system is input at 210.

At 221, the system is synthesized and a netlist is generated. Synthesis includes generating a logic design of the system to be implemented by the target device. According to an embodiment of the present disclosure, synthesis generates an optimized logical representation of the system from an HDL design definition. Synthesis also includes mapping the optimized logic design (technology mapping). Mapping includes determining how to implement logic gates and logic elements in the optimized logic representation with specific resources on the target device such as logic elements and functional blocks.

At 212, the system is placed. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

At 213, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

Timing analysis may be performed. According to an embodiment of the present disclosure, the timing analysis determines whether timing constraints of the system are satisfied. As part of timing analysis, slack analysis may be performed. It should be appreciated that the timing analysis may be performed during and/or after each of the synthesis 211, placement 212, and routing procedures 213 to guide compiler optimizations.

At 214, an assembly procedure is performed. The assembly procedure involves creating a configuration file (program file) output at 216 that includes information determined by the procedures described at 211-213. The configuration file may be a configuration bit stream that may be used to configure (program) a target device. In the case of an ASIC, the configuration file may represent the physical layout of the circuit.

At 215, the configuration file output at 216 is used to program the target device according to the system design. By programming the target with the configuration file, components (programmable resources) on the target device are physically transformed to implement the system. According to an embodiment of the present disclosure, when the target device is a programmable logic device, the programmable resources may include components such as programmable logic blocks, and digital signal processor blocks that may be used to implement logic functions. The programmable resources may also include programmable routing that connects the logic functions. The configuration file with configuration bitstream may be used to configure an FPGA using various programming technologies. For instance, an FPGA may utilize static random access memory (SRAM), flash, or antifuse-based programming technology to program the programmable resources. The SRAM-based programming technology uses static memory cells which are divided throughout the FPGA to configure routing interconnect which are steered by small multiplexers, and to configure logic blocks to implement logic functions. Similarly, flash-based programming technology uses floating-gate transistors in flash memory for configuration storage. Antifuse-based programming technology requires burning of antifuses to program resources. The antifuse-based programming technology allows for programming only once and FPGAs utilizing antifuse-based programming cannot be reprogrammed.

According to an embodiment of the present disclosure, a contrived RTL description of the system is used to produce a first SOF image for the system in the configuration file output at 216. The configuration file output at 216 may include a first or an initial overlay for the system. This device image has the proper topology, wiring connectivity, and timing for circuitry of the system, but leaves portions of the functionality unimplemented.

Procedures 221-224, described with reference to FIG. 2, may be performed by a second processing unit such as second processing unit 130 (shown in FIG. 1) or be performed by an internal processing unit such as internal processing unit 111 in target device 110. The register transfer language (RTL) description of a system is input to procedure 221 where hardware customization is performed. At 221, modifications are identified for the system. According to an embodiment of the present disclosure, identifying the modification is performed in response to analyzing the RTL description of the system. Identifying the modification may also or alternatively be performed in response to analyzing an input file provided by a user or by analyzing an operating environment of the target device. Low level hardware instructions are generated to implement additional functionalities desired for the system. According to an embodiment of the present disclosure, multiple stages of modifications may be identified where each stage is represented by a different overlay. In this embodiment, low level hardware instructions are generated to implement additional functionalities desired for the system at each modification stage.

At 222, in response to one or more modifications identified, physical bits to change in the configuration file 216 are identified to effectuate the one or more modifications identified. According to an embodiment of the present disclosure, this is achieved by using an edit script.

At 223, the physical bits in the configuration file are changed to implement the one or more modifications desired. According to an embodiment of the present disclosure, this is achieved by using edit tools directed by the edit script. A modified configuration file is generated at 223 and output at 225.

At 224, the modified configuration file output at 225 is used to program the target device according to the modified system design. By programming the target with the modified configuration file output at 225, components (programmable resources) on the target device are physically transformed to implement the system. According to an embodiment of the present disclosure, the configuration of the modified system involves implementing a different overlay than the initial overlay configured at 215. The configuration of the modified system at 224 is a partial reconfiguration of the system.

In the embodiment illustrated in FIG. 2, further modifications may be made to the system to generate additional overlays. At 231, in response to one or more modifications identified at 221, physical bits to change in the modified configuration file output at 225 to effectuate the one or more modifications are identified.

At 232, the physical bits in the modified configuration file output at 225 are changed to implement the one or more modifications desired. A second modified configuration file is generated at 232 and output at 234.

At 233, the second modified configuration file output at 234 is used to program the target device according to the modified system design. By programming the target with the second modified configuration file output at 234, components (programmable resources) on the target device are physically transformed to implement the system. According to an embodiment of the present disclosure, the configuration of the modified system involves implementing a different overlay than the initial overlay configured at 224. The configuration of the modified system at 233 is a partial reconfiguration of the system.

It should be appreciated that the procedures illustrated in FIG. 2 may be repeated to further alter the functionality of the system. The editable portion of the original system represented in the first configuration file output at 216 may vary in scale from a single cell to a majority of the entire system. The techniques disclosed may be used to revise settings such as multiplier coefficients and/or multiplexer steering patterns without the need to repeat a full compilation flow and without the associated risk of timing failure.

FIG. 2 is a flow chart that illustrates embodiments of the present disclosure. The procedures described in this figure may be performed in part by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 3:
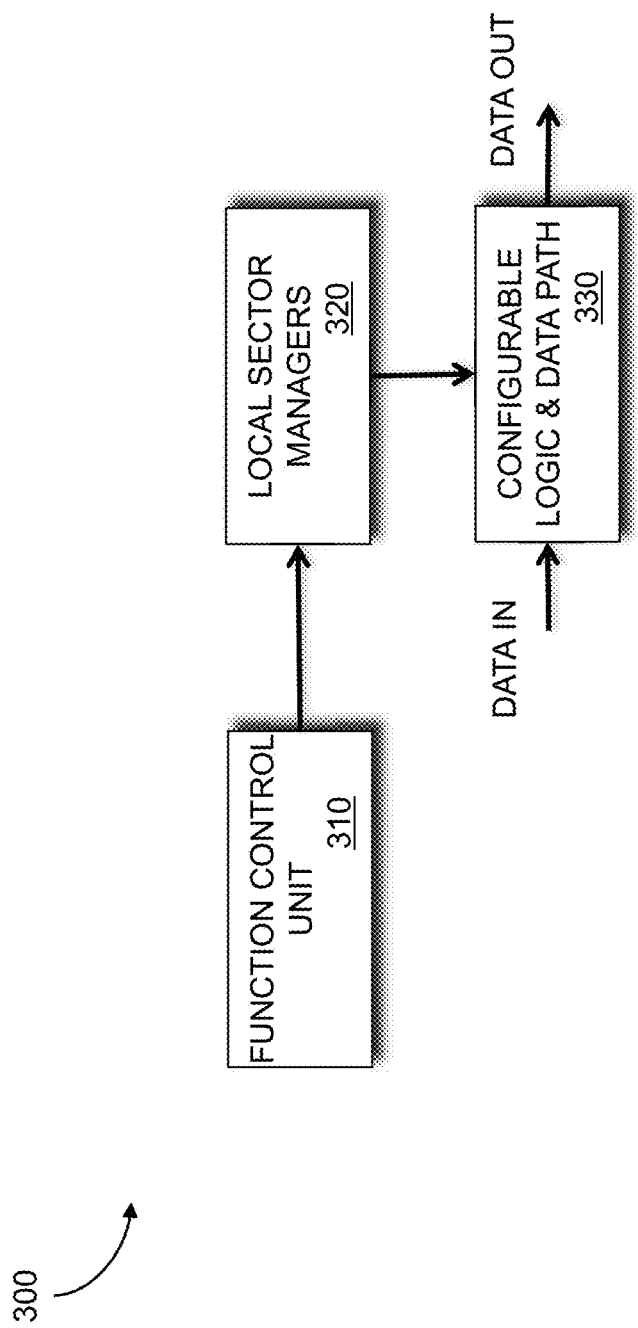
FIG. 3 is a block diagram of a self modification unit on a target device according to an exemplary embodiment of the present disclosure.

FIG. 3 is a block diagram of a self-modification unit 300 on a target device according to an exemplary embodiment of the present disclosure. According to an embodiment of the present disclosure, the self-modification unit 300 may be implemented in part by the internal processing unit 111 on the target device (shown in FIG. 1). The self-modification unit 300 includes a function control unit 310, local sector managers 320, and a configurable data path 330. The function control unit 310 interprets configuration information from a configuration file or a modified configuration file and distributes the configuration information to local sector managers 320. The local sector managers 320 connect to silicon switches which control the behavior of configurable logic and data path 330.

The functional control block 310 may be implemented as a state machine or soft microcontroller on a programmable logic device fabric. A state machine or soft microcontroller would be sufficient to implement previously identified edits such as changing a function in a LUT mask. The self-modification unit 300 supports small, localized changes in a configuration to produce variations of a circuit without requiring reengaging the traditionally required full CAD flow.

Referring back to FIG. 2, when identifying modifications to make to a system and customizing hardware at procedure 221, the architecture of the target device is considered. A programmable logic device such as a field programmable gate array (FPGA), can be thought of as either a collection of multiplexers, or alternately a collection of small read only memories (ROMs). Configuration bits are loaded into single bit random access memories (RAMs), which can then be selectively accessed using dynamic control inputs of each logic block. The logic function as a function of the inputs is therefore not entirely correct. The inputs are the address lines for the memory bits, which collectively include all possible combinations of the logic function required and one of the combinations. In addition, registers may be associated with every logic block. However, many designs can be implemented without these registers. Another consideration in building dense designs on FPGAs is that the routing, i.e.

the wires that carry the logic inputs, do not cover the input functions independently. Typically, 2 of the 4 bit inputs can be independently controlled. Finding a way to reduce the independent control bits is therefore highly desirable.

Figure 4:
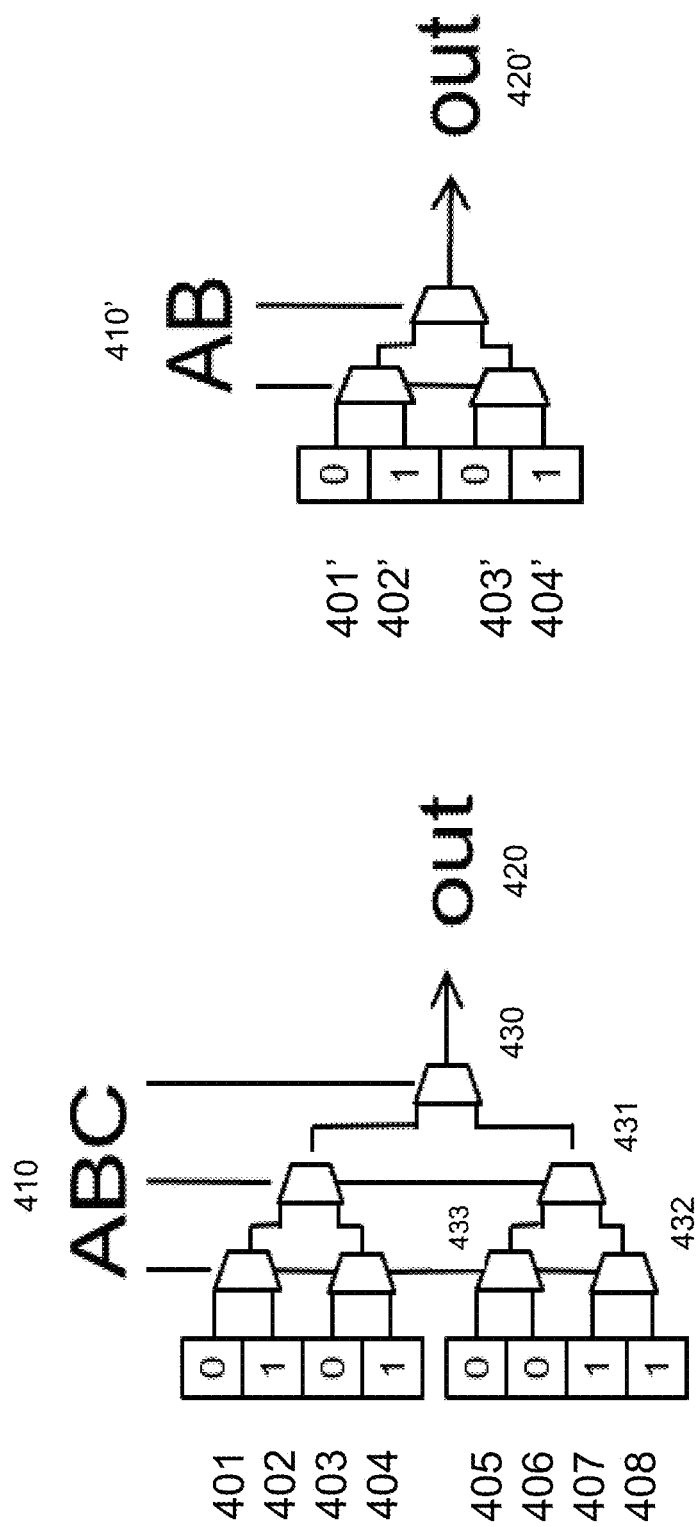
FIG. 4A illustrates an exemplary logic function that may be implemented on a field programmable gate array according to an exemplary embodiment of the present disclosure.
FIG. 4B illustrates the logic function illustrated in FIG. 4A with modifications that reduce a 3 LUT to a 2 LUT according to an exemplary embodiment of the present disclosure.

FIG. 4A illustrates an exemplary logic function that may be implemented on an FPGA. The logic function has three input signals 410, A, B, C, and one output signal 420, out. The logic function includes a RAM based look up table (LUT) capable of representing all possible 3 input functions (referred to as a 3-LUT). The function is selected by the RAM content loaded into storage elements 401-408, collectively referred to as the LUT mask. The inputs and outputs are determined by which wires are connected to the signals A, B, C, and out which may be part of a routing configuration of the cell which is not shown. This mask is set to the logical function of 2:1 MUX (1100 1010). Therefore, if C out=B else out=A. When C, which acts as the select signal, is 1, internal mux 431 is connected to the output. Based on the value of B, mux 431 will pass through either mux 433 (when B=0), or mux 432 (when B=1). It should be noted that the configured RAM 405-408 match the value of B, regardless of the value of the A input.

If the value of C is supposed to be static for an extended period of time, but varying within a given configuration of the FPGA, changes to the LUT mask programming can create the same selection behavior. Notice that if 405-408 are copied from 401-404, then the value of signal A flows to the output regardless of the B and C values. Similarly, if 401-404 are copied from 405-408, B flows through. Normally the mask bits are set during the compilation flow and remain immutable. The ability to change the mask bits at a later point in time, through the procedures and hardware discussed above, is valuable because the C input is no longer required. The 3 LUT can be replaced with a modifiable 2 LUT, which creates a substantial cost savings.

FIG. 4B illustrates the logic function illustrated in FIG. 4A with modifications that reduce a 3 LUT to a 2 LUT according to an exemplary embodiment of the present disclosure. As illustrated, input signal 410' A is passed to the output 420'. Changing the LUT mask bits 401'-404' to 1100 would pass through the value of B instead. The function of the C input in FIG. 4A is now implemented by the LUT programming rather than a dynamic signal, at circuitry cost savings. An added advantage is that this transformation is also beneficial to speed and power. It should be appreciated that by implementing the procedures illustrated in FIG. 2 where different overlays for a system are used to implement different LUT masks for LUT programming, the advantages illustrated in FIG. 4B may be realized.

Figure 5:
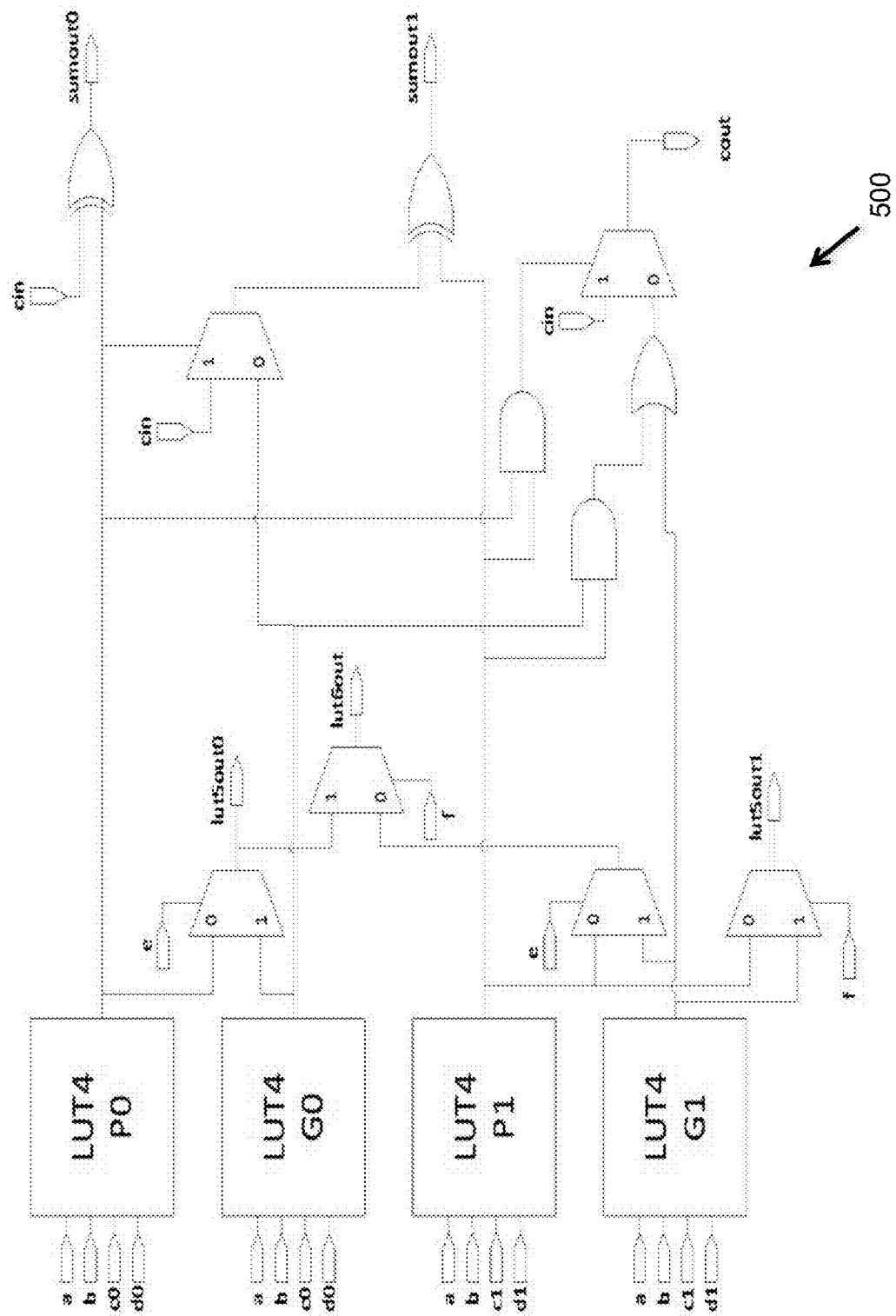
FIG. 5 illustrates an exemplary logic block in a field programmable gate array according to an exemplary embodiment of the present disclosure.

FIG. 5 illustrates an exemplary logic block 500 in a field programmable gate array. The logic block includes a plurality of LUTs. The structure of the logic block 500 can be split apart (into 4 LUT components), or used as a whole, supporting a 6 LUT. Other configurations may also be implemented. Note that for many of these cases, independent inputs are not available, at least when combined with a plurality of other logic blocks in the next level of logic.

Figure 6B:
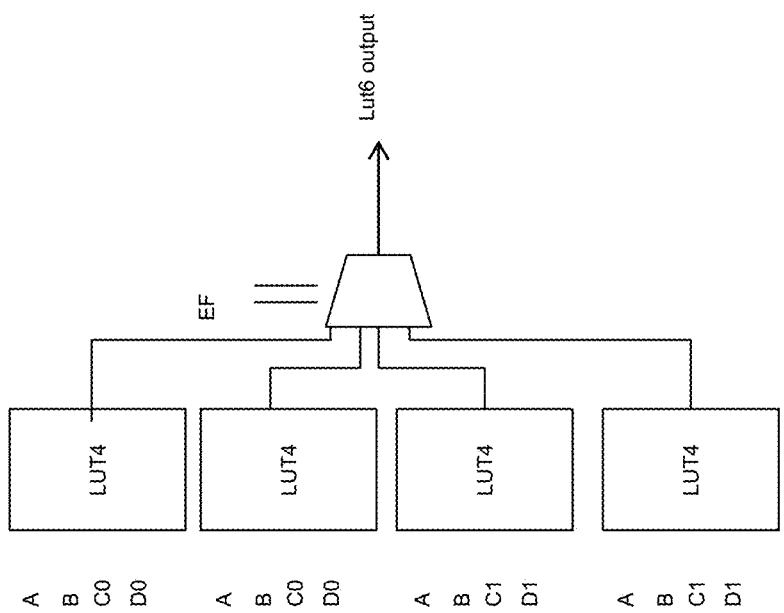
FIG. 6B illustrates a single 6 LUT according to an exemplary embodiment of the present disclosure.
Figure 6A:
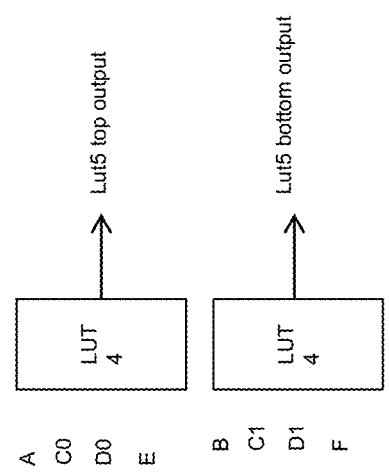
FIG. 6A illustrates two independent 4 LUT components according to an exemplary embodiment of the present disclosure.

FIG. 6A illustrates two independent 4 LUT components according to an exemplary embodiment of the present disclosure. FIG. 6A illustrates a simplified representation of a configuration which divides a cell into two independent halves, each with 4 of the 8 inputs, generating two independent outputs.

FIG. 6B illustrates a single 6 LUT according to an exemplary embodiment of the present disclosure. When configured as a 6 LUT, the C0 and C1 signals are connected together, and the D0 and D1 signals are connected together.

Figure 7A:
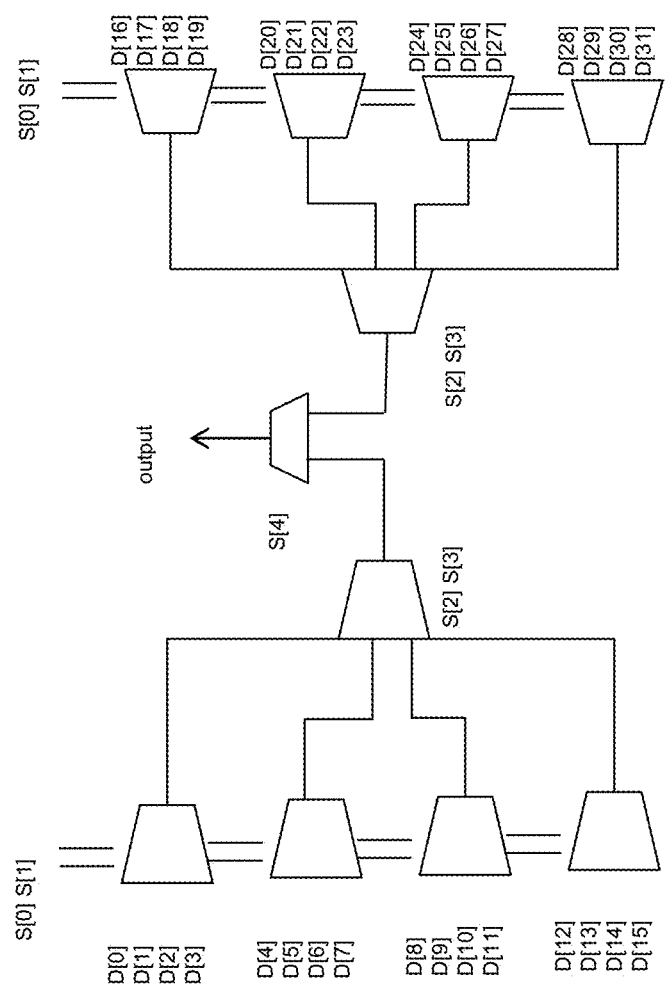
FIG. 7A illustrates a plurality of logic blocks combined to implement a 32:1 multiplexer according to an embodiment of the present disclosure.

FIG. 7A illustrates a plurality of logic blocks combined to implement a 32:1 multiplexer according to an exemplary embodiment of the present disclosure. As shown, the hardware cost of the 32:1 multiplexer is 11 cells, 5 for each of the left and right 16:1 stacks, and 1 to combine the two stacks.

Figure 7B:
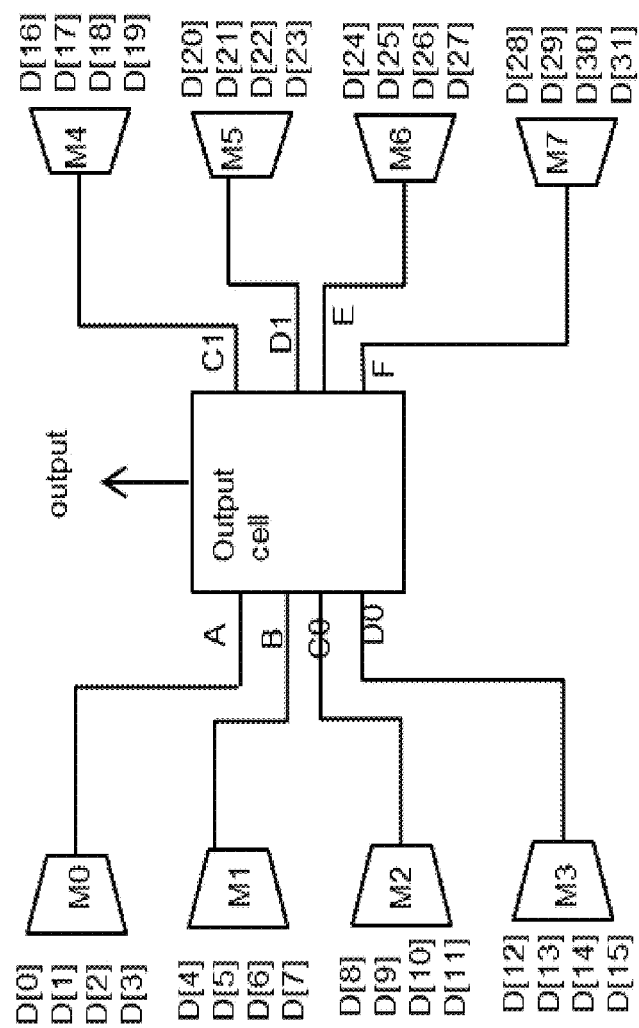
FIG. 7B illustrates a plurality of logic blocks combined to implement an improved 32:1 multiplexer according to an embodiment of the present disclosure.

FIG. 7B illustrates a plurality of logic blocks combined to implement an improved 32:1 multiplexer according to an exemplary embodiment of the present disclosure. The select lines are changed by reprogramming the LUT masks (statically or dynamically) rather than utilizing traditionally routed dynamic signals. The leaf multiplexers labeled M0-M7 on FIG. 7B are reduced from 6 inputs to 4 inputs, which reduces their cost by half. The central complex (Output cell) has 8 data inputs from the leaf multiplexers, however, 3 select lines (S2,S3,S4) are removed with the design. The central complex can be implemented with a single cell, rather than requiring 3 cells. It should be appreciated that by implementing the procedures illustrated in FIG. 2 where different overlays for a system are used to implement different LUT masks for LUT programming, the advantages illustrated in FIG. 7B may be realized.

FIG. 8 illustrates a table for programming the improved 32:1 multiplexer according to an embodiment of the present disclosure. The table details the configuration pattern to load for each of the desired selects. In the 8:23 range, the m6 and m7 leaves do not have active data, but need to cooperate to help the E and F inputs of the output cell steer the appropriate quadrant of the mask toward the output. Blank entries in the table are unused and should be set to a constant for power reduction.

By implementing the techniques disclosed, selects are removed allowing for the area required for the circuit to be reduced to slightly less than half of the original required area. The circuit is modified to also have a combinational depth of 2 rather than its original depth of 3 (~33% faster). This effect scales well for larger multiplexer sizes.

Figure 9A:
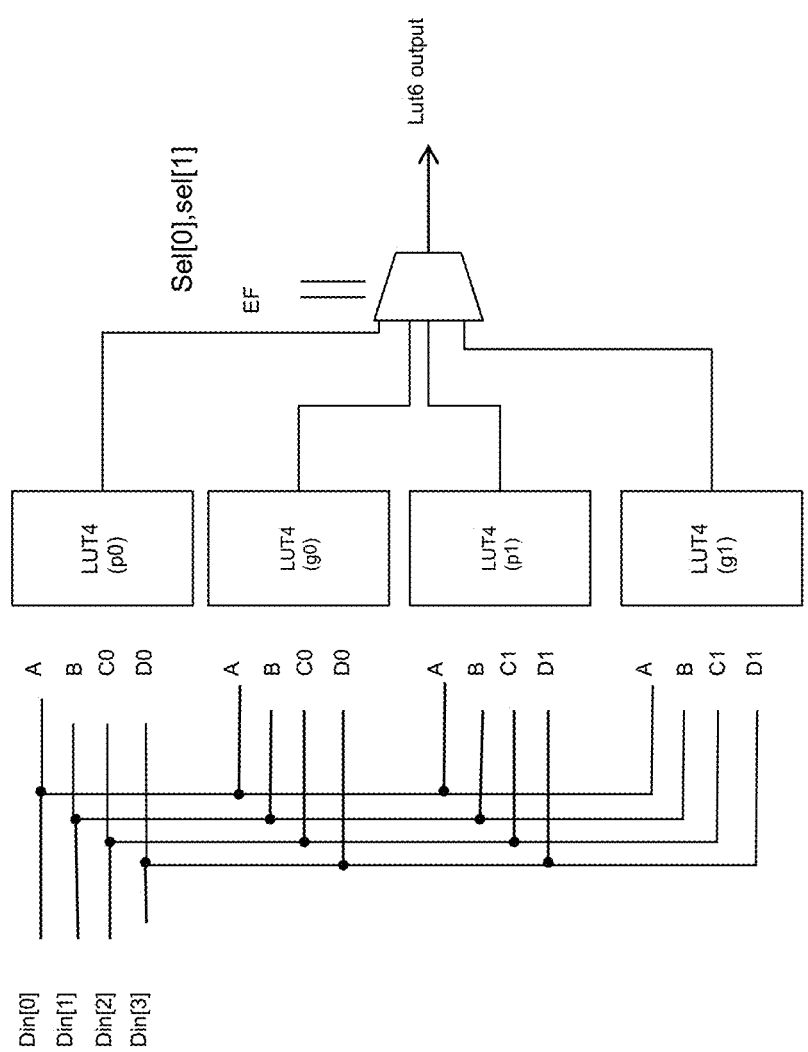
FIG. 9A illustrates a CLOS network switch according to an exemplary embodiment of the present disclosure.

FIG. 9A illustrates a CLOS network switch according to an exemplary embodiment of the present disclosure. A CLOS network is a multi-input, multi-output network. CLOS networks may be used to implement many different communications structures. The basic building block of these networks are small switches which are combined to make a multi-width, multi-depth network. For many applications, such as Ethernet, the switch pattern changes infrequently. Rather than implementing a fully dynamically (cycle by cycle) network, a much smaller (and faster/lower latency and therefore lower power) network can be created using the techniques of the present disclosure. The network flexibility of the fully dynamic switch is preserved in the overlay, but the exact connection pattern can be reloaded into the LUTs when it needs to be changed. As illustrated in FIG. 9A a total of 4 logic blocks are used, one for each output.

Figure 9B:
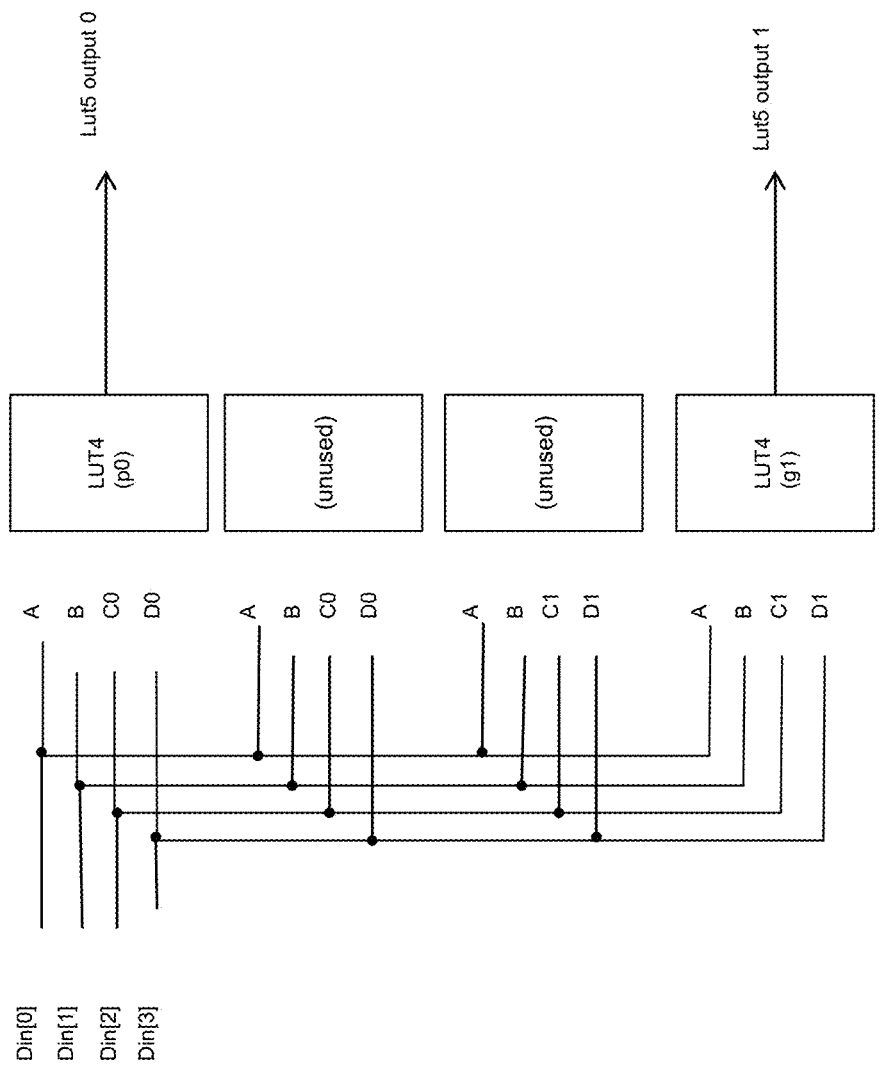
FIG. 9B illustrates an improved CLOS network switch according to an exemplary embodiment of the present disclosure.

FIG. 9B illustrates an improved CLOS network switch according to an exemplary embodiment of the present disclosure. In this embodiment, if a network routing needs to be changed, a new LUT mask is reloaded. The improved CLOS network switch requires only 2 logic blocks. It should be appreciated that by implementing the procedures illustrated in FIG. 2 where different overlays for a system are used to implement different LUT masks for LUT programming, the advantages illustrated in FIG. 9B may be realized.

The techniques disclosed may also be used to improve systems used for machine learning. A key to machine learning inference includes processing large arrays of the dot products (A0*B0+A1*B1 . . . ) where typically "A" is an image or sound sample being considered and "B" is a weight which corresponds to the importance of that attribute in a broader decision.

Weights are typically held static for a significant period of time between network trainings, while sample data is rapidly evolving. Approaches have been taken to incorporate the weights into a compiled circuit implementation of the network to reduce cost. For example, A*0 can be simplified to 0, A*2 can be simplified to A shifted left. The problem with this approach is that the size and timing of the circuit is now coupled in a somewhat chaotic way to the trained weight values. Small changes in weights can produce dramatic circuit area or speed changes in the compiled result. This leads to the undesirable possibilities of the resulting circuit overflowing the available space for circuitry on an FPGA device or failing to satisfy a timing requirement. The techniques of the present disclosure enables the creation of a family of programmable dot products which are cheaper than a fully dynamic version, but retains predictability of area and speed. Furthermore, a LUT programmable version can be modified with a procedure which is much faster than the general compilation flow.

FIG. 10 illustrates relationships used for performing canonic constant multiplication using a LUT mask according to an exemplary embodiment of the present disclosure. The relationships illustrate a strategy to build a single arithmetic chain which takes the input data word, and selects via the LUT mask to add two selections of that data. Inverting bits and adding constant values enables the selection of 2's complement negative numbers. Selecting a shifted version of the data is equivalent to multiplication or division by powers of two. It should be appreciated that the mask for multiplication by −5 is the most complex, as the value of decimal 2 is required to be added to convert the shifted partial product from 1's complement to 2's complement. This may be achieved by the coding of an arithmetic half-adder structure in the mask, to open up two bit positions.

The relationships illustrated in FIG. 10 were used to construct an array of 19,712 of 16 bit constant signed multipliers, arranged in dot products. FIGS. 11-14 illustrate how LUT masks change to implement different multiplication values.

Figure 11A:
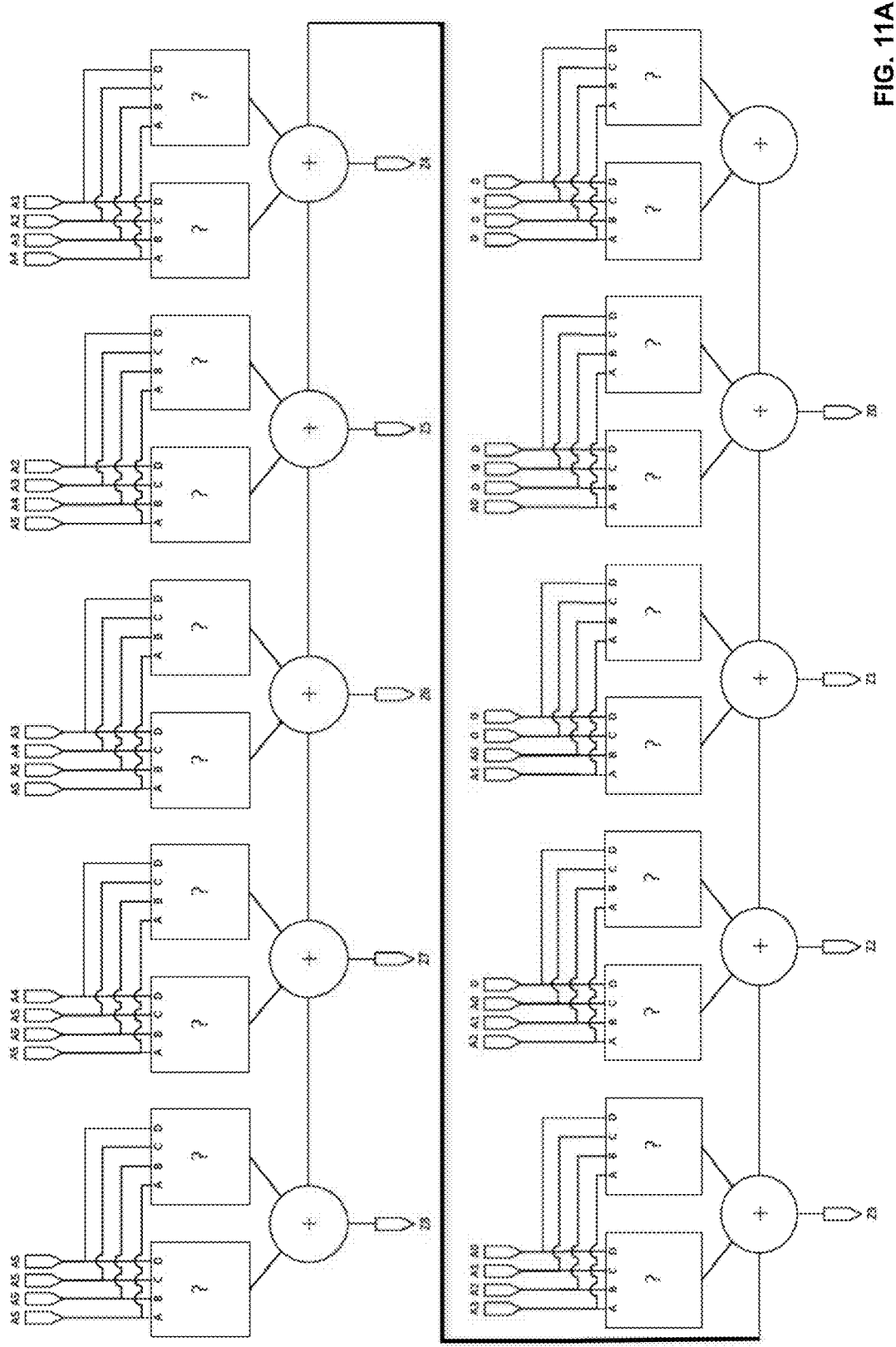
FIGS. 11A-11B illustrate a LUT mask for a generic multiplication according to an exemplary embodiment of the present disclosure.
Figure 11B:
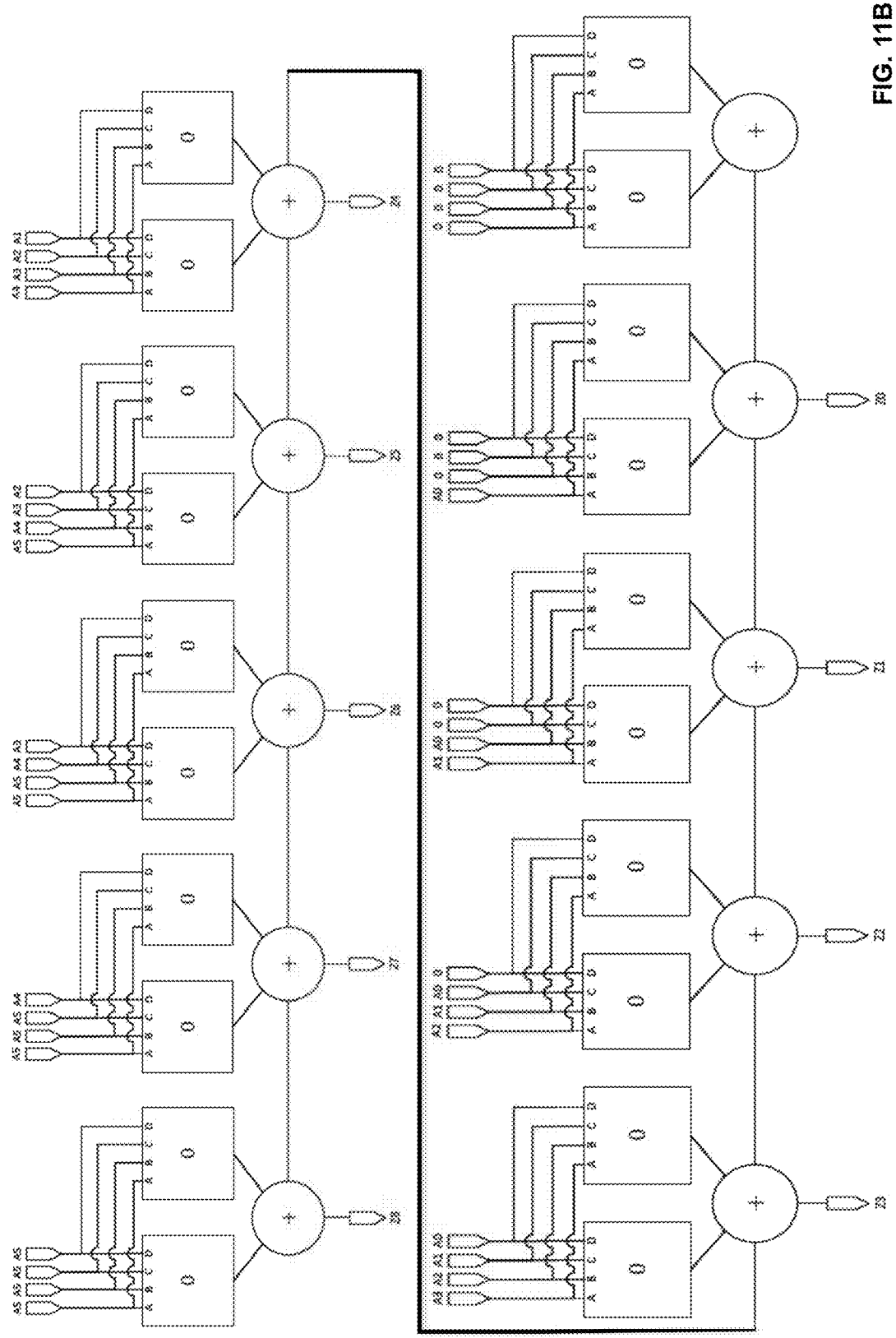

FIG. 11A illustrates a LUT mask for a generic multiplication according to an exemplary embodiment of the present disclosure. At every half logic block, a higher order multiplicand bit is added to the LUT input, and the lowest order multiplicand is removed. Asymptotically, the number of logic blocks required for a N×N bit multiplication is therefore N/2. FIG. 11B illustrates the case of multiplication by 0. The LUTs are all filled with zeros. In practice, the same structure would still be used, as the point of the overlay is that any multiplier value could be loaded in as required.

Figure 12A:
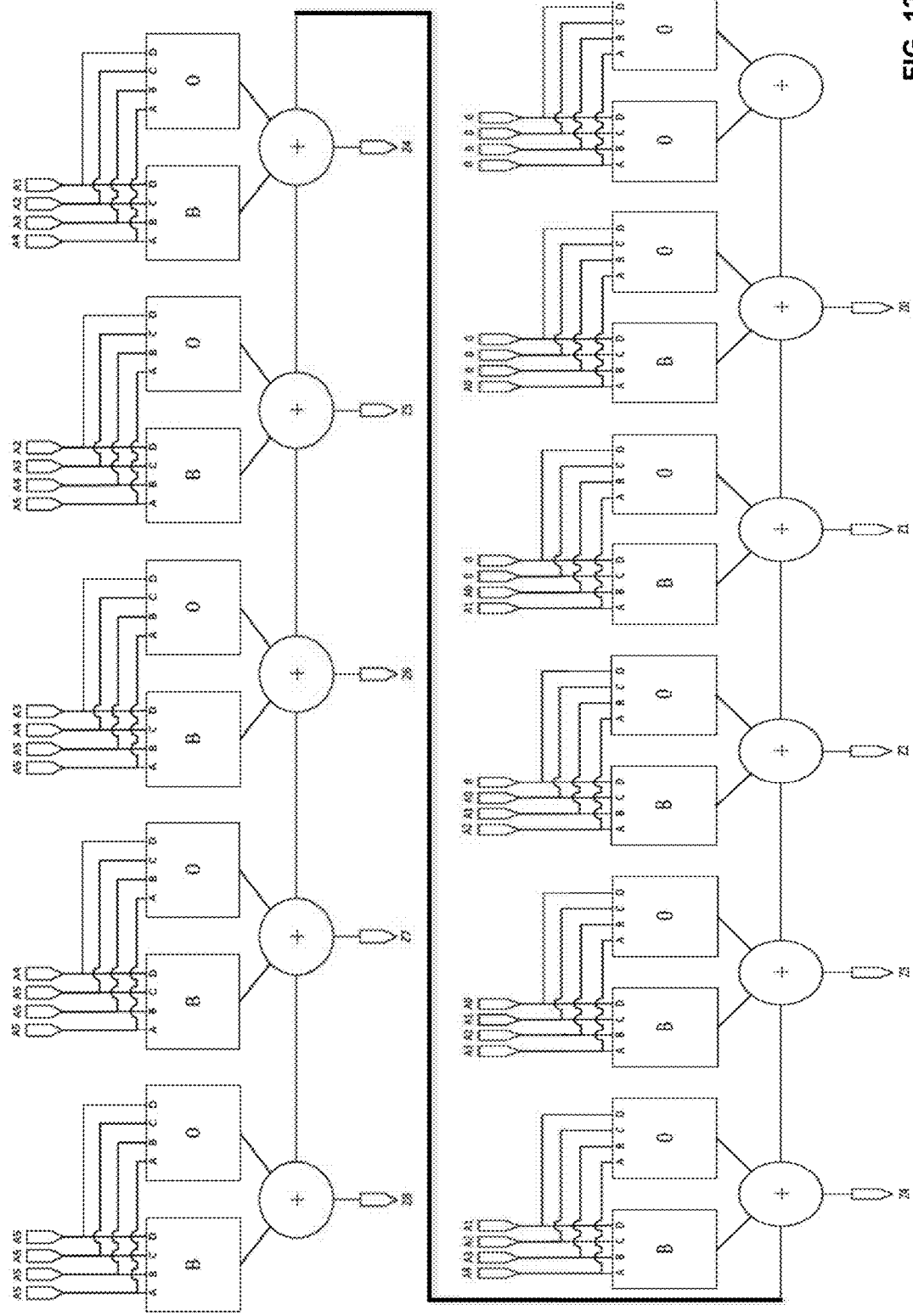

FIGS. 12A and 12B illustrate a LUT mask for the programming for simple cases x2 and x3 according to an exemplary embodiment of the present disclosure. For x2, only one of the LUTs needs to be used. The other does not impact the adder. In the x2 case, the next more significant bit to the current index is selected. The x3 case uses the LUT mask of the x2 case, and a LUT mask for the other LUT that selects the bit index to be the same as the current LUT index. These two values are then added together by the embedded adder.

Figure 13A:
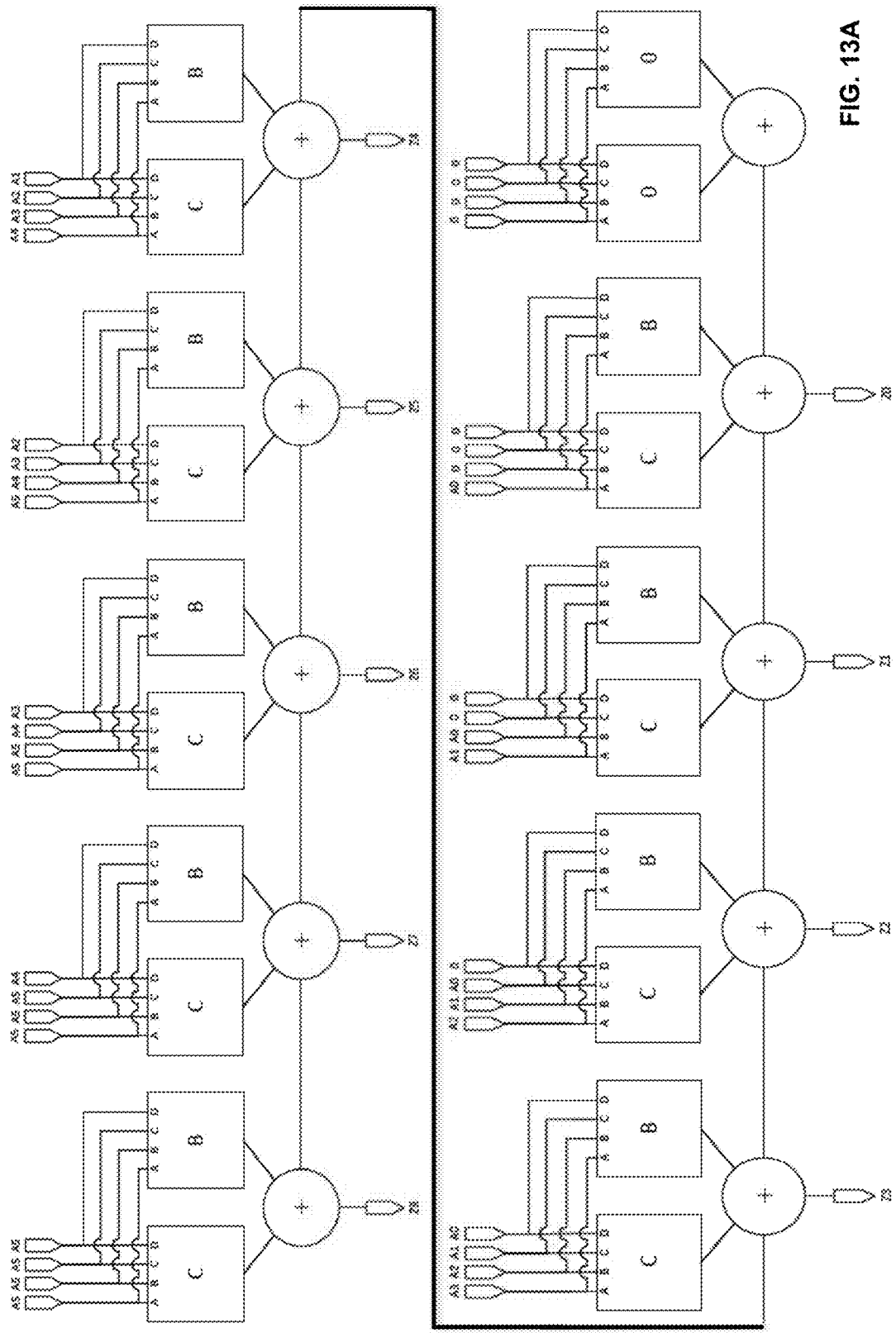
FIGS. 13A-13B illustrate a LUT mask for the programming for x6 and x7 according to an exemplary embodiment of the present disclosure.
Figure 13B:
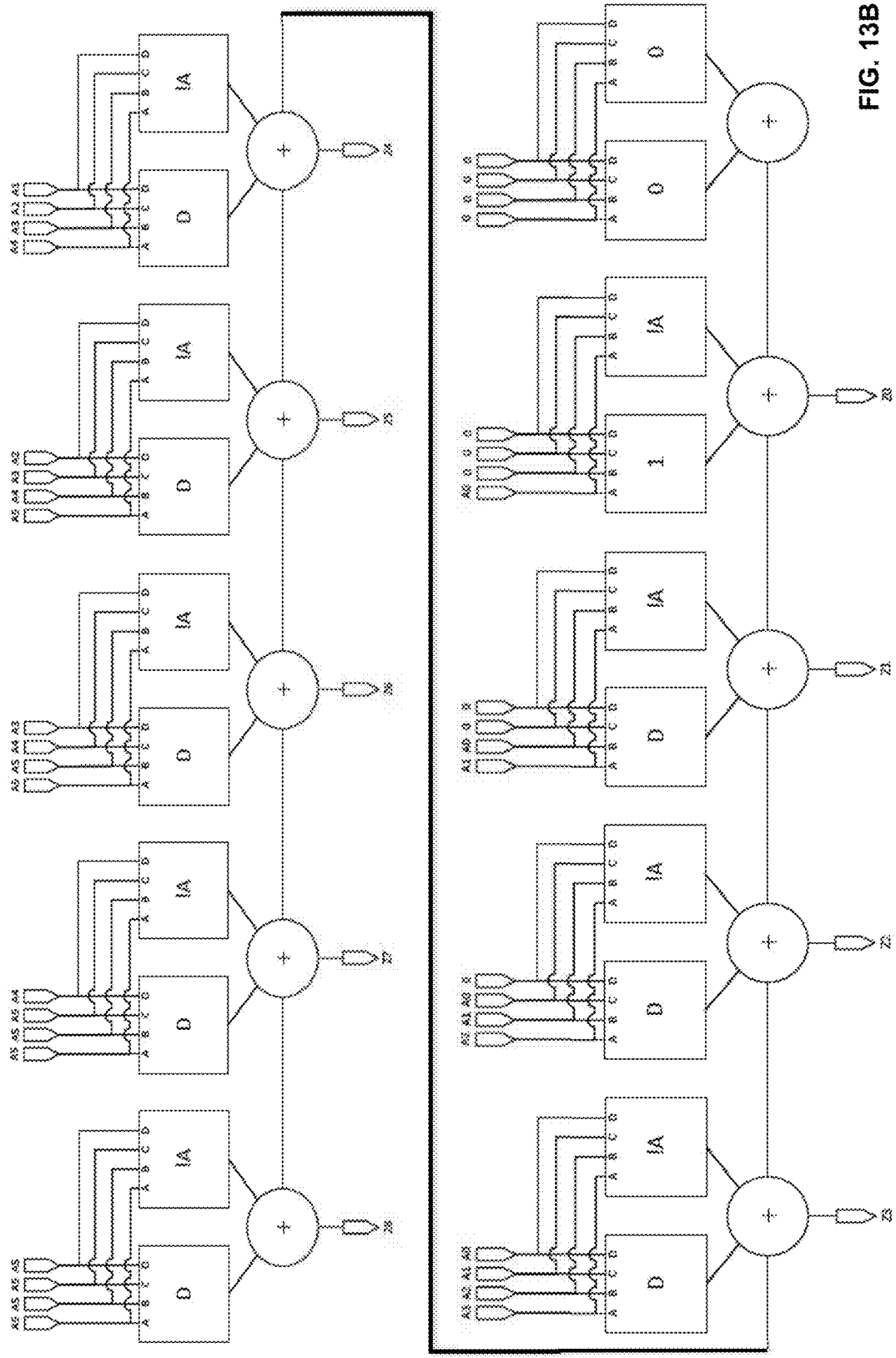

FIGS. 13A and 13B illustrate a LUT mask for the programming for x6 and x7 according to an exemplary embodiment of the present disclosure. The x6 case is shown for contrast, and by inspection is very similar to the x3 case. For x7, the LUT mask is x8-x1.

Figure 14A:
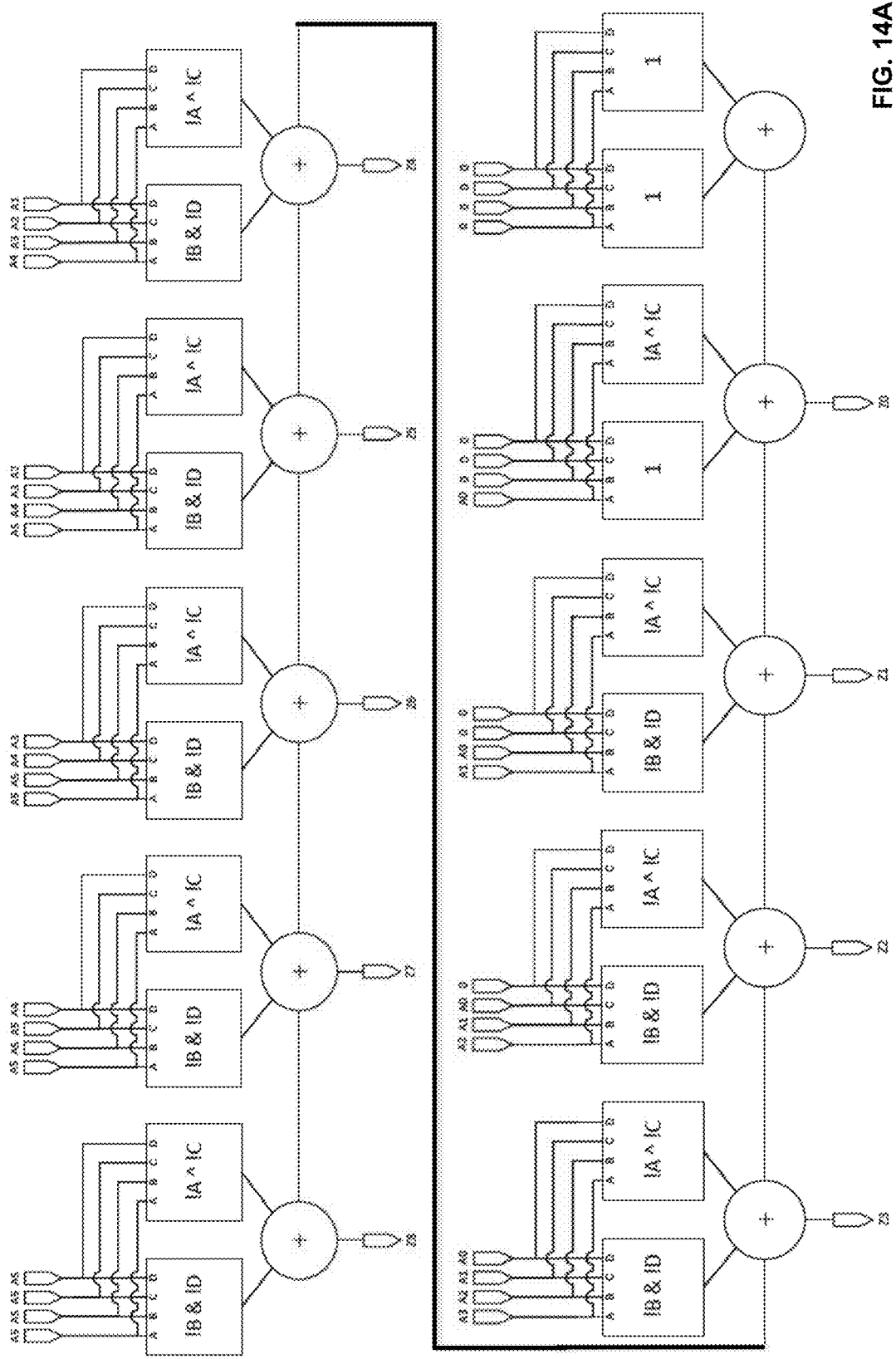
FIGS. 14A and 14B illustrate a LUT mask for the programming for −x5 and −x6 according to an exemplary embodiment of the present disclosure.
Figure 14B:
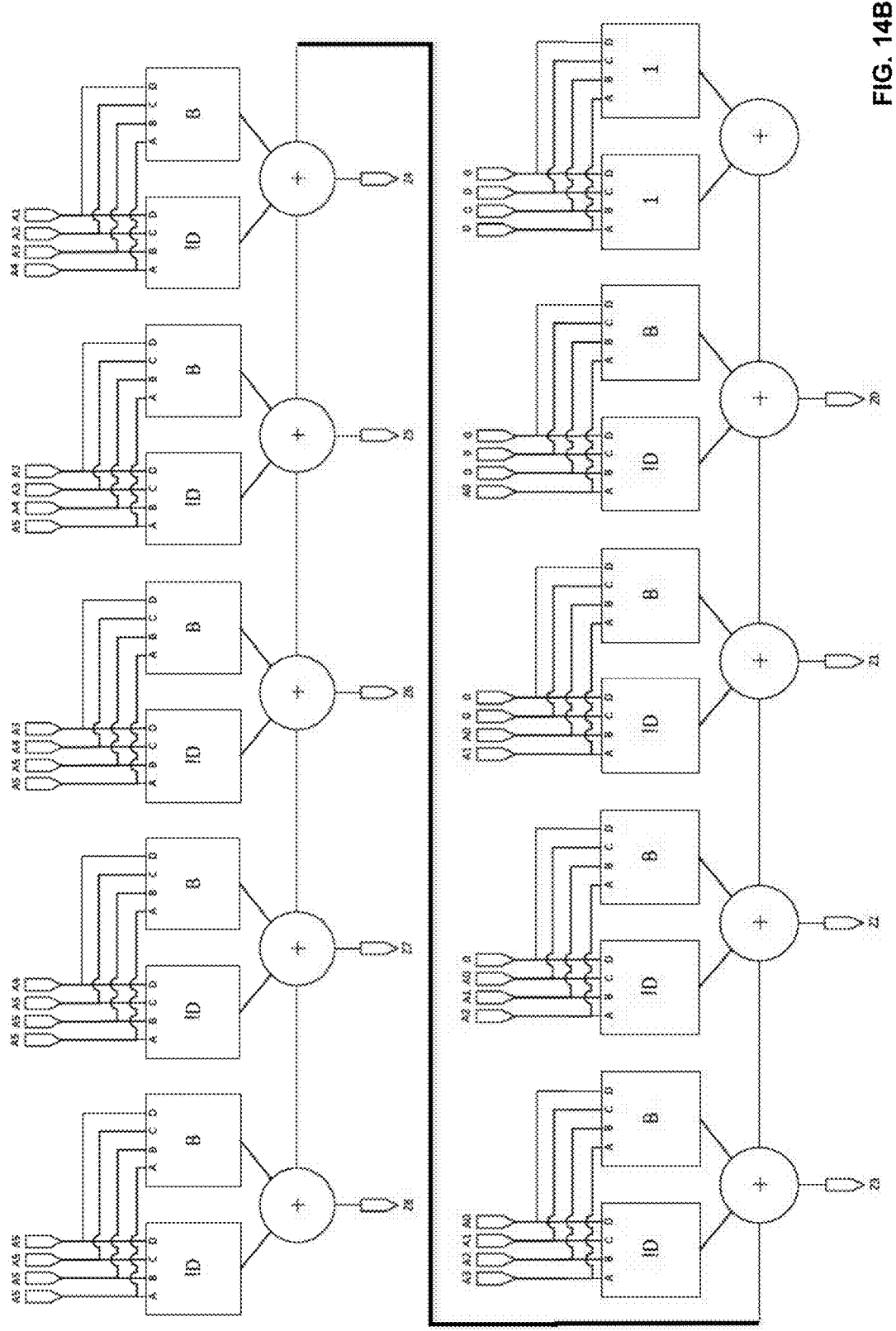

FIGS. 14A and 14B illustrate a LUT mask for the programming for −x5 and −x6 according to an exemplary embodiment of the present disclosure. Negative multipliers can now be described using a similar technique. In FIG. 14B, the −x6 case is −8x+2x. The inversion of the x8 creates the ones complement value, which must be turned into a two's complement value by adding a '1' to the LSB. can be accomplished by forcing a carry out of the LSB adder bit, by adding two '1's together. The −x5 case is the most complex one presented here. There are two negative values added together, so a '2' must be added to the LSB to turn both from one's complement numbers into two's complement numbers. This is accomplished by recoding the two inversions into the half adder sum of the two inversions. This creates two "holes" in the LSB where a '1' can be added in. One of the '1's is created the same way as the −x5 case, with a carry out from the LSB adder. The other can be directly added to the LSB bit position. It should be appreciated that by implementing the procedures illustrated in FIG. 2 where different overlays for a system are used to implement different LUT masks for LUT programming, the advantages illustrated in FIGS. 10-14 may be realized.

Figure 15:
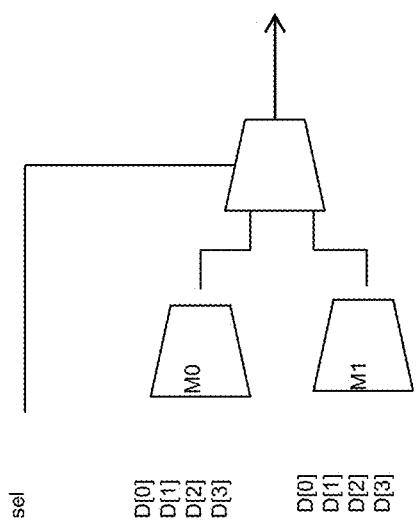
FIG. 15 illustrates a shadow logic arrangement to support LUT reconfiguration and dynamic shadowing according to an exemplary embodiment of the present disclosure.

FIG. 15 illustrates a shadow logic arrangement to support LUT reconfiguration and dynamic shadowing according to an exemplary embodiment of the present disclosure. The reconfiguration of LUT masks is likely to be slow compared to the switching of dynamic signals within an FPGA device. It is possible to mix mask reconfigurable logic and dynamic logic to mitigate this effect by having multiple copies.

FIG. 15 illustrates a shadow logic arrangement where a dynamic select signal "sel" can connect the M0 function to the output signal, while operating at the speed of a dynamic signal. According to an embodiment of the present disclosure, dynamic signals operate at 1 or 2 ns, and configuration speeds operate at least a thousand times slower than the dynamic signals. During this time a mechanism not illustrated resembling the self modification procedure shown in FIG. 3 can change the functionality of the M1 function at a leisurely pace. When it is ready to switch, the "sel" signal can rapidly shift to connect M1 (based on the same input data signals) to the output. At this point the M0 function can be modified at a leisurely pace.

A bit is saved in two places, and at any point in time one value is being shown while the other is being updated. The difference here is that the hidden copy is really unavailable due to undergoing functional changes rather than simply having an unwanted view.

Shadowing as described above would enable this area saving technique to be used in cases which would otherwise be infeasible due to requirements for the speed of switching between modes. It generalizes to cases where a subset of behaviors are of short term interest. For example a logic block with 32 operations which never uses more than 3 of the choices within a short time window could be implemented with 4 LUT programmable options, where at any point in time 3 are active, and 1 is being loaded to prepare. This is advantageous if the cost of 4 static options plus the switching mux is less than the cost of a circuit that dynamically implements all 32 options.

Figure 16:
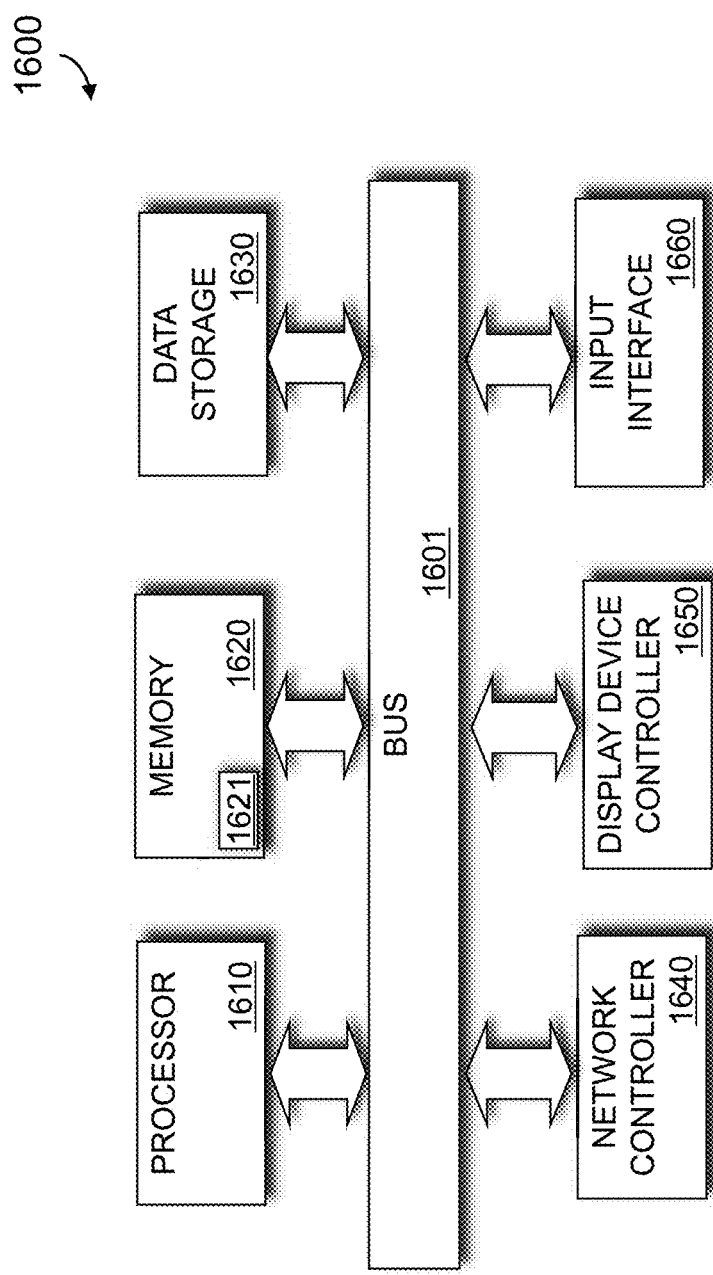
FIG. 16 is a block diagram of an exemplary computer system in which an example embodiment of the present disclosure resides.

FIG. 16 is a block diagram of an exemplary computer system 1600 in which an example embodiment of the present disclosure resides. Computer system 1600 may be used to implement processing unit 120 and/or processing unit 130 (shown in FIG. 1). The computer system 1600 includes a processor 1610 that process data signals. The processor 1610 is coupled to a bus 1601 or other switch fabric that transmits data signals between processor 1610 and other components in the computer system 1600. The computer system 1600 includes a memory 1620. The memory 1620 may store instructions and code represented by data signals that may be executed by the processor 1610. A data storage device 1630 is also coupled to the bus 1601.

A network controller 1640 is coupled to the bus 1601. The network controller 1640 may link the computer system 1600 to a network of computers (not shown) and supports communication among the machines. A display device controller 1650 is coupled to the bus 1601. The display device controller 1650 allows coupling of a display device (not shown) to the computer system 1600 and acts as an interface between the display device and the computer system 1600. An input interface 1660 is coupled to the bus 1601. The input interface 1660 allows coupling of an input device (not shown) to the computer system 1600 and transmits data signals from the input device to the computer system 1600.

A system designer 1621 may reside in the memory 1620 and be executed by the processor 1610. The system designer 1621 may operate to perform design generation, synthesis, placement, routing, timing analysis, assembly, and configuration of a design for the system. The system designer may also perform identification of modifications, identification of physical bits to change in a configuration file to effectuate modification, changing the physical bits, and reconfiguration of a design for the system.

Figure 17:
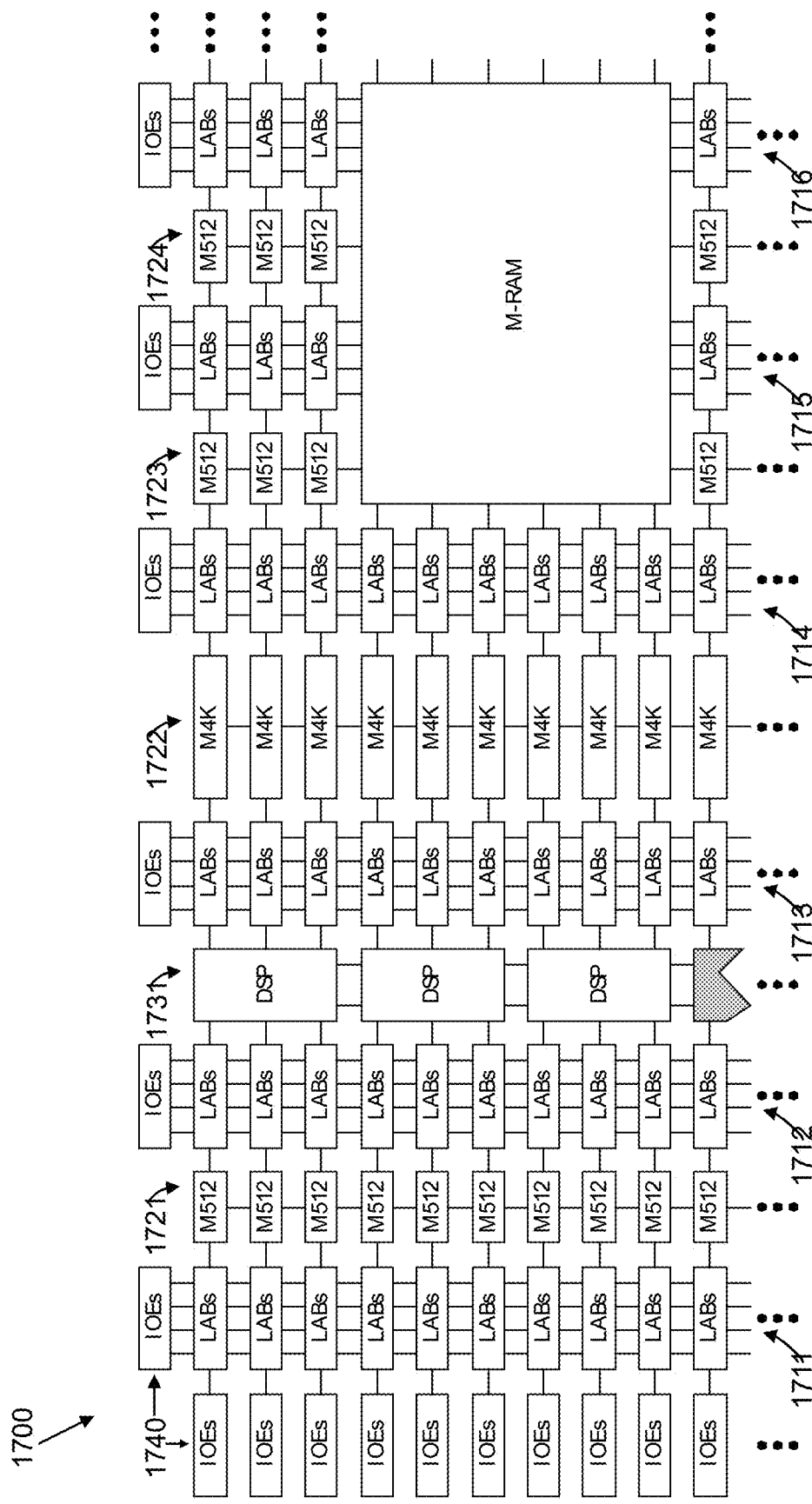
FIG. 17 illustrates an exemplary target device according to an exemplary embodiment of the present disclosure.

FIG. 17 illustrates a target device 1700 according to an embodiment of the present disclosure. The target device 1700 may be implemented on a die as an integrated circuit. The target device 1700 is a programmable logic device such a field programmable gate array (FPGA) that includes a plurality of logic-array blocks (LABs). According to an embodiment of the present disclosure, the target device 1700 may be used to implement the target device 110 (shown in FIG. 1). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Intel Corporation, or a combinational logic block (CLB) such as those found in Virtex devices manufactured by Xilinx Inc. In this embodiment, the logic block may include a four input LUT with a configurable register. According to an embodiment of the present disclosure, the logic block may be implemented by an adaptive logic module (ALM), such as those found in Stratix devices manufactured by Intel Corporation. LABs are grouped into rows and columns across the device 1700. Columns of LABs are shown as 1711-1716. It should be appreciated that the logic block may include additional or alternate components. It should be appreciated that a carry chain may be implemented with the resources of one or more LABs in the device 1700.

The device 1700 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1700. Columns of memory blocks are shown as 1721-1724.

The device 1700 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1700 and are shown as 1731.

The device 1700 includes a plurality of input/output elements (IOEs) 1740. Each IOE feeds an IO pin (not shown) on the device 1700. The IOEs 1740 are located at the end of LAB rows and columns around the periphery of the device 1700. Each IOE may include a bidirectional IO buffer and a plurality of registers for registering input, output, and output-enable signals.

The device 1700 may include routing resources such as LAB local interconnect lines, row interconnect lines ("H-type wires"), and column interconnect lines ("V-type wires") (not shown) to route signals between components on the target device.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The following examples pertain to further embodiments. In one embodiment, a method for designing a system on a target device, comprises synthesizing the system from a register transfer level description, placing the system on the target device, routing the system on the target device, generating a configuration file that reflects the synthesizing, placing, and routing of the system for programming the target device, identifying a modification for the system, and modifying the configuration file to effectuate the modification for the system without changing the placing and routing of the system.

In a further embodiment, the method wherein identifying the modification is performed in response to analyzing a register transfer level description of the system.

In a further embodiment, the method wherein identifying the modification is performed in response to analyzing an input file provided by a user.

In a further embodiment, the method wherein identifying the modification is performed by a state machine that analyzes an operating environment of the target device.

In a further embodiment, the method wherein the synthesizing, placing, routing, and generating are performed by a first processing unit, and the identifying and modifying are performed by a second processing unit separate from the first processing unit.

In a further embodiment, the method wherein the second processing unit is on the target device.

In a further embodiment, the method further comprising identifying another modification for the system, and modifying the modified configuration file to effectuate the another modification without changing the placing and routing of the system.

In a further embodiment, the method wherein modifying the configuration file changes a look up table (LUT) mask that effectively reduces a number of select signals input into a multiplexer network.

In a further embodiment, the method wherein the multiplexer network is implemented in a CLOS network.

In a further embodiment, the method wherein modifying the configuration file changes a look up table (LUT) mask that effectively implements different multiplication values in a multiplier.

In a further embodiment, the method wherein modifying the configuration file results in a reduction of a power requirement of the system.

In a further embodiment, the method wherein modifying the configuration file changes coefficient values in a multiplier.

In a further embodiment, a method for designing a system on a target device, comprising compiling a description of the system to generate a configuration file for programming the target device to implement the system, identifying a modification for the system, and modifying the configuration file to effectuate the modification for the system by changing a look up table (LUT) mask on the target device.

In a further embodiment, the method wherein changing the LUT mask effectively reduces a number of select signals input into a multiplexer network.

In a further embodiment, the method wherein changing the LUT mask effectively implements different multiplication values in a multiplier.

In a further embodiment, the method wherein changing the LUT mask effectively implements different coefficients in an artificial neural network.

In a further embodiment, the method wherein the compiling is performed by a first processing unit, and the identifying and modifying are performed on a second processing unit separate from the first processing unit.

In a further embodiment, the method wherein the second system is on the target device.

In a further embodiment, the method wherein modifying the configuration file is performed without changing a placing and routing of the system.

In a further embodiment, the method further comprising identifying another modification for the system, and modifying the modified configuration file to effectuate the another modification.

In a further embodiment, a non-transitory computer readable medium including a sequence of instructions stored thereon for causing a computer to execute a method for designing a system on a target device, comprising synthesizing the system from a register transfer level description, placing the system on the target device, routing the system on the target device, generating a configuration file that reflects the synthesizing, placing, and routing of the system for programming the target device, identifying a modification for the system; and modifying the configuration file to effectuate the modification for the system without changing the placing and routing of the system.

In a further embodiment, the non-transitory computer readable medium wherein identifying the modification is performed by a state machine that analyzes an operating environment of the target device.

In a further embodiment, the non-transitory computer readable medium wherein the synthesizing, placing, routing, and generating are performed by a first processing unit, and the identifying and modifying are performed by a second processing unit separate from the first processing unit.

In a further embodiment, the non-transitory computer readable medium wherein the second processing unit is on the target device.

In a further embodiment, the non-transitory computer readable medium wherein modifying the configuration file changes a look up table (LUT) mask that effectively reduces a number of select signals input into a multiplexer network.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, comprising:
   synthesizing the system from a register transfer level description;
   placing the system on the target device;
   routing the system on the target device;
   generating a configuration file that reflects the synthesizing, placing, and routing of the system for programming the target device;
   identifying a modification for the system; and
   modifying the configuration file to effectuate the modification for the system without changing the placing and routing of the system.

2. The method of claim 1, wherein identifying the modification is performed in response to analyzing a register transfer level description of the system.

3. The method of claim 1, wherein identifying the modification is performed in response to analyzing an input file provided by a user.

4. The method of claim 1, wherein identifying the modification is performed by a state machine that analyzes an operating environment of the target device.

5. The method of claim 1, wherein the synthesizing, placing, routing, and generating are performed by a first processing unit, and the identifying and modifying are performed by a second processing unit separate from the first processing unit.

6. The method of claim 5, wherein the second processing unit is on the target device.

7. The method of claim 1 further comprising:
   identifying another modification for the system;
   modifying the modified configuration file to effectuate the another modification without changing the placing and routing of the system.

8. The method of claim 1, wherein modifying the configuration file changes a look up table (LUT) mask that effectively reduces a number of select signals input into a multiplexer network.

9. The method of claim 8, wherein the multiplexer network is implemented in a CLOS network.

10. The method of claim 1, wherein modifying the configuration file changes a look up table (LUT) mask that effectively implements different multiplication values in a multiplier.

11. The method of claim 1, wherein modifying the configuration file results in a reduction of a power requirement of the system.

12. The method of claim 1, wherein modifying the configuration file changes coefficient values in a multiplier.

13. A method for designing a system on a target device, comprising:
    placing the system on the target device;
    routing the system on the target device;
    compiling a description of the system to generate a configuration file that reflects the placing and routing of the system for programming the target device to implement the system;
    identifying a modification for the system; and
    modifying the configuration file to effectuate the modification for the system by changing a look up table (LUT) mask on the target device without changing the placing and routing of the system.

14. The method of claim 13, wherein changing the LUT mask effectively reduces a number of select signals input into a multiplexer network.

15. The method of claim 13, wherein changing the LUT mask effectively implements different multiplication values in a multiplier.

16. The method of claim 13, wherein changing the LUT mask effectively implements different coefficients in an artificial neural network.

17. The method of claim 13, wherein the compiling is performed by a first processing unit, and the identifying and modifying are performed on a second processing unit separate from the first processing unit.

18. The method of claim 17, wherein the second system processing unit is on the target device.

19. The method of claim 13 further comprising:
    identifying another modification for the system; and
    modifying the modified configuration file to effectuate the another modification.

20. A non-transitory computer readable medium including a sequence of instructions stored thereon for causing a computer to execute a method for designing a system on a target device, comprising:
    synthesizing the system from a register transfer level description;
    placing the system on the target device;
    routing the system on the target device;
    generating a configuration file that reflects the synthesizing, placing, and routing of the system for programming the target device;
    identifying a modification for the system; and
    modifying the configuration file to effectuate the modification for the system without changing the placing and routing of the system.

21. The non-transitory computer readable medium of claim 20, wherein identifying the modification is performed by a state machine that analyzes an operating environment of the target device.

22. The non-transitory computer readable medium of claim 20, wherein the synthesizing, placing, routing, and generating are performed by a first processing unit, and the identifying and modifying are performed by a second processing unit separate from the first processing unit.

23. The non-transitory computer readable medium of claim 22, wherein the second processing unit is on the target device.

24. The non-transitory computer readable medium of claim 20, wherein modifying the configuration file changes a look up table (LUT) mask that effectively reduces a number of select signals input into a multiplexer network.

* * * * *